United States Patent
Xing et al.

(10) Patent No.: US 9,980,239 B2
(45) Date of Patent: May 22, 2018

(54) SIGNAL PROCESSING METHOD, BASE STATION, TERMINAL, AND SYSTEM

(71) Applicant: China Academy of Telecommunications Technology, Beijing (CN)

(72) Inventors: Yanping Xing, Beijing (CN); Weijie Xu, Beijing (CN); Minli Jia, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 145 days.

(21) Appl. No.: 14/438,330

(22) PCT Filed: Oct. 31, 2013

(86) PCT No.: PCT/CN2013/086325
§ 371 (c)(1),
(2) Date: Apr. 24, 2015

(87) PCT Pub. No.: WO2014/067472
PCT Pub. Date: May 8, 2014

(65) Prior Publication Data
US 2015/0289216 A1    Oct. 8, 2015

(30) Foreign Application Priority Data
Nov. 2, 2012    (CN) .......................... 2012 1 0434756

(51) Int. Cl.
*H04W 56/00*    (2009.01)
*H04W 84/04*    (2009.01)

(52) U.S. Cl.
CPC ..... *H04W 56/001* (2013.01); *H04W 56/0015* (2013.01); *H04W 84/042* (2013.01)

(58) Field of Classification Search
CPC ........... H04W 56/0015; H04W 56/001; H04W 84/042; H04W 84/045; H04B 7/2656;
(Continued)

(56) References Cited

U.S. PATENT DOCUMENTS 9,332,516 B2 * 5/2016 Blankenship ..... H04W 56/0015
9,497,719 B2 * 11/2016 You ....................... H04J 11/0073
(Continued)

FOREIGN PATENT DOCUMENTS

| CN | 101267226 | 9/2008 |
|----|-----------|--------|
| CN | 101465830 | 6/2009 |

(Continued)

OTHER PUBLICATIONS

Extended European Search Report for EP Application No. 13851028.4 dated Oct. 2, 2015.
International Search Report for PCT/CN2013/086325 dated Jan. 23, 2014.

*Primary Examiner* — George Eng
*Assistant Examiner* — Umair Ahsan
(74) *Attorney, Agent, or Firm* — Foley & Lardner LLP

(57) ABSTRACT

Disclosed are a signal processing method, a base station, a terminal, and a system. A base station side method comprises: sending a synchronization signal to a terminal through a predetermined first time-frequency resource; sending a supplemental synchronization signal different from the synchronization signal to the terminal through a predetermined second time-frequency resource, the synchronization signal and the supplemental synchronization signal being corresponding to a same physical layer cell identifier. In the technical solution provided by the embodiments of the present invention, in addition to that the synchronization signal is sent, the supplemental synchronization signal is also sent, and it is equivalent to increase of the transmission frequency of the synchronization signal. In (Continued)

a case where the network coverage is poor, the increase of the transmission frequency of the synchronization signal can increase the probability that the terminal completes cell searching by performing relevant detection on the same number of signals, so as to not only shorten the time required by the terminal to perform cell searching, but also decrease the amount of data buffered by the terminal, thereby decreasing the requirements on the buffer of the terminal.

10 Claims, 4 Drawing Sheets

(58) Field of Classification Search
CPC .. H04J 11/005; H04J 11/0069; H04J 11/0073; H04J 11/0076; H04J 11/0079; H04J 2211/001
See application file for complete search history.

(56) References Cited

U.S. PATENT DOCUMENTS

2011/0310878 A1* 12/2011 Lindoff ................. H04J 11/005
370/343
2012/0082152 A1  4/2012 Baldemair et al.

FOREIGN PATENT DOCUMENTS

| CN | 101527595 | 9/2009 |
|---|---|---|
| CN | 101601206 | 12/2009 |
| CN | 101621308 | 1/2010 |
| CN | 101867981 | 10/2010 |
| CN | 102223696 | 10/2011 |
| EP | 2400805 A2 | 12/2011 |
| WO | WO-2010/090776 | 8/2010 |

* cited by examiner

SIGNAL PROCESSING METHOD, BASE STATION, TERMINAL, AND SYSTEM

This application is a US National Stage of International Application No.PCT/CN2013/0086325, filed Oct. 31, 2013, designating the United States, and claiming priority to Chinese Patent Application No. 201210434756.8, filed with the State Intellectual Property Office of China on Nov. 02, 2012 and entitled "Signal processing method, base station, terminal and system", which is hereby incorporated by reference in its entirety.

FIELD OF THE PRESENT DISCLOSURE

The present disclosure relates to the field of wireless communication technology and particularly to a signal processing method, eNB, UE and system.

BACKGROUND OF THE PRESENT DISCLOSURE

Synchronization signals in a Long Term Evolution (LTE) system include a Primary Synchronization Signal (PSS) and a Secondary Synchronization Signal (SSS). A User equipment (UE) achieves cell search based upon a PSS and an SSS transmitted by an evolved Node B (eNB).

Particularly a PSS sequence can be referred to as a primary synchronization sequence, and an SSS sequence can be referred to as a secondary synchronization sequence.

Cell search is the first operation of the UE entering the cell. The UE is synchronized in the downlink with the eNB by cell search (the synchronization includes time synchronization and frequency synchronization), acquires a physical layer cell identifier (ID) of the cell by detecting synchronization signals, and further receives and reads broadcast information of the cell.

There are 504 physical layer cell IDs in the LTE system, and the 504 physical layer cell IDs are divided into 168 physical layer cell ID groups, where each group includes three physical layer cell IDs. Thus one physical layer cell ID can be defined uniquely by a physical layer cell ID group ID $N_{ID}^{(1)}$ (which ranges from 0 to 167 and is carried over a secondary synchronization channel) representing a physical layer cell ID group, and a physical layer ID $N_{ID}^{(2)}$ (which ranges from 0 to 2 and is carried over a primary synchronization channel) representing a physical layer ID within the physical layer cell ID group, that is, $N_{ID}^{cell}=3N_{ID}^{(1)}+N_{ID}^{(2)}$, herein $N_{ID}^{cell}$ represents a physical layer cell ID.

The physical layer ID $N_{ID}^{(2)}$ within the physical layer cell ID group corresponds to a PSS sequence in a one-to-one manner, and the physical layer cell ID group ID $N_{ID}^{(1)}$ corresponds to an SSS sequence in a one-to-one manner. The eNB determines the PSS sequence and the SSS sequence according to the physical layer cell ID, and transmits the sequences at corresponding time-frequency locations.

As described above, the UE is synchronized in downlink in time and frequency with the eNB by cell search, and acquires a physical layer cell ID by detecting synchronization signals. Since the UE has no idea of timing of the eNB and the sequences of the synchronization signals before the UE finishes the cell search, the UE needs to perform correlation detection on all the sequences for the respective OFDM symbols, to thereby determine the timing of the current cell and the sequences of the synchronization signals according to correlation detection results.

In a scenario with poor coverage of an LTE network, a radio signal may be seriously blocked and greatly attenuated, and the UE needs to perform correlation detection for multiple times, to thereby correctly achieve the cell search. In the case of poor coverage, the UE may perform correlation detection for tens or even hundreds of times. In the prior art, the synchronization signals occurs only once every 5 ms, and the UE needs to buffer tens or even hundreds of 5 ms signals, so the demand for the buffer of the UE may be very high. Moreover the period of time for cell search may be very long.

SUMMARY OF THE PRESENT DISCLOSURE

An object of the present disclosure is to provide a signal processing method, eNB, UE and system, so as to address such a problem that the UE needs to buffer a large number of signals and consume a long period of time for cell search, to thereby correctly achieve the cell search when the network coverage is poor.

The object of the present disclosure is attained by the following technical solutions:

A signal transmitting method includes:

transmitting synchronization signals to a UE over a predetermined first time-frequency resource; and transmitting a supplementary synchronization signal different from the synchronization signals to the UE over a predetermined second time-frequency resource, herein both the synchronization signals and the supplementary synchronization signal correspond to the same physical layer cell ID.

A signal receiving method includes:

receiving synchronization signals carried over a predetermined first time-frequency resource, receiving a supplementary synchronization signal carried over a predetermined second time-frequency resource, and achieving downlink synchronization with an eNB, and determining a physical layer cell ID, using the synchronization signals and the supplementary synchronization signal, herein both the synchronization signals and the supplementary synchronization signal correspond to the same physical layer cell ID;

or receiving the supplementary synchronization signal carried over the predetermined second time-frequency resource, and achieving downlink synchronization with the eNB, and determining the physical layer cell ID, using the supplementary synchronization signal.

An eNB includes:

a synchronization transmitting component configured to transmit synchronization signals to a UE over a predetermined first time-frequency resource; and a supplementary synchronization transmitting component configured to transmit a supplementary synchronization signal different from the synchronization signals to the UE over a predetermined second time-frequency resource, herein both the synchronization signals and the supplementary synchronization signal correspond to the same physical layer cell ID.

An eNB includes a processor and a data transceiving interface, wherein:

the processor is configured to transmit synchronization signals to a UE over a predetermined first time-frequency resource; and to transmit a supplementary synchronization signal different from the synchronization signals to the UE over a predetermined second time-frequency resource, herein both the synchronization signals and the supplementary synchronization signal correspond to the same physical layer cell ID; and the data transceiving interface is configured to communicate data with the UE.

A UE includes:

a first signal receiving component is configured to receive synchronization signals carried over a predetermined first time-frequency resource, and to receive a supplementary synchronization signal carried over a predetermined second time-frequency resource, and a first cell searching component is configured to achieve downlink synchronization with an eNB, and to determine a physical layer cell ID, using the synchronization signals and the supplementary synchronization signal, herein both the synchronization signals and the supplementary synchronization signal correspond to the same physical layer cell ID; or a second signal receiving component is configured to receive a supplementary synchronization signal carried over the predetermined second time-frequency resource; and a second cell searching component is configured to achieve downlink synchronization with an eNB, and to determine a physical layer cell ID, using the supplementary synchronization signal.

A UE includes a processor and a data transceiving interface, wherein:

the processor is configured to receive synchronization signals carried over a predetermined first time-frequency resource, and to receive a supplementary synchronization signal carried over a predetermined second time-frequency resource; and to achieve downlink synchronization with an eNB, and to determine a physical layer cell ID, using the synchronization signals and the supplementary synchronization signal, herein both the synchronization signals and the supplementary synchronization signal correspond to the same physical layer cell ID; or the processor is configured to receive a supplementary synchronization signal carried over the predetermined second time-frequency resource; and to achieve downlink synchronization with an eNB, and to determine a physical layer cell ID, using the supplementary synchronization signal; and the data transceiving interface is configured to communicate data with the eNB.

A communication system includes:

an eNB configured to transmit synchronization signals to a UE over a predetermined first time-frequency resource; and to transmit a supplementary synchronization signal different from the synchronization signals to the UE over a predetermined second time-frequency resource, herein both the synchronization signals and the supplementary synchronization signal correspond to the same physical layer cell ID; and the UE configured to receive the synchronization signals carried over the predetermined first time-frequency resource, to receive the supplementary synchronization signal carried over the predetermined second time-frequency resource, and to achieve downlink synchronization with the eNB, and to determine the physical layer cell ID, using the synchronization signals and the supplementary synchronization signal; or to receive the supplementary synchronization signal carried over the predetermined second time-frequency resource, and to achieve downlink synchronization with the eNB, and to determine the physical layer cell ID, according to the supplementary synchronization signal.

With the technical solutions according to embodiments of the present disclosure, the cNB transmits the supplementary synchronization signal in addition to the synchronization signals, which means that the synchronization signals are transmitted at a higher frequency. In the case of poor network coverage, improving the frequency of transmitting the synchronization signals can increase the probability for the UE to achieve cell search by performing correlation detection on the same number of signals, thus shortening the time for the cell search of the UE, and also reducing the amount of data buffered by the UE, and hence lowering the requirement for the buffer of the UE.

DETAILED DESCRIPTION OF THE EMBODIMENTS

In order to enable a UE to achieve cell search as quickly as possible, to thereby lower the amount of buffered data, embodiments of the present disclosure provide a signal transmitting method, in which an eNB transmits synchronization signals to the UE over a predetermined first time-frequency resource, and transmits a supplementary synchronization signal different from the synchronization signals to the UE over a predetermined second time-frequency resource, herein the supplementary synchronization signal is used for the UE to achieve downlink synchronization with the eNB and to determine a physical layer cell ID, and both the synchronization signals and the supplementary synchronization signal correspond to the same physical layer cell ID.

In embodiments of the present disclosure, the synchronization signals transmitted to the UE over the first time-frequency resource is synchronization signals defined in the existing communication standard.

In embodiments of the present disclosure, the first time-frequency resource refers to a time-frequency resource over which the synchronization signals (the PSS and the SSS above) defined in the existing communication standard is carried, and the second time-frequency resource refers to a time-frequency resource over which the supplementary synchronization signal defined in an embodiment of the present disclosure is carried.

The eNB pre-agrees the second time-frequency resource with the UE which achieves cell search based upon the supplementary synchronization signal, that is, the UE knows in advance the predetermined second time-frequency resource. In the method according to an embodiment of the present disclosure, the supplementary synchronization signal is transmitted in addition to the synchronization signals, which means that the synchronization signals are transmitted at a higher frequency. In the case of poor network coverage, improving the frequency of transmitting the synchronization signals can increase the probability for the UE to achieve cell search by performing correlation detection on the same number of signals, thus shortening a period of time for the cell search of the UE, and also reducing the amount of data buffered by the UE, and hence lowering the requirement for the buffer of the UE.

In an embodiments of the present disclosure, the UE that knows the second time-frequency resource occupied by the supplementary synchronization signal in advance, and achieves cell search using the supplementary synchronization signal is referred to as a first UE, whereas a traditional UE which cannot know in advance the second time-frequency resource occupied by the supplementary synchronization signal is referred to as a second UE.

The technical solution according to embodiments of the present disclosure will be described below in details with reference to the drawings.

Figure 1:
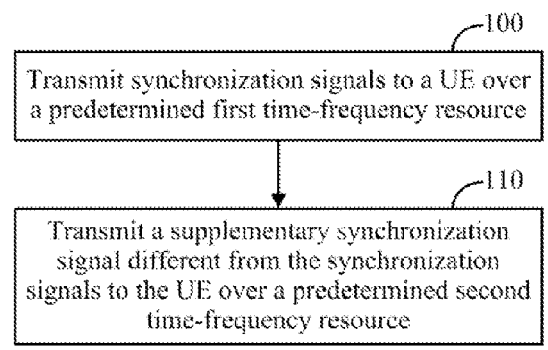
FIG. 1 illustrates a flow chart of a signal transmitting method according to an embodiment of the present disclosure.

An embodiment of the present disclosure provides a signal transmitting method, and FIG. 1 illustrates an implementation of the method particularly including the following operations:

Operation 100: transmit synchronization signals to a UE over a predetermined first time-frequency resource; and Operation 110: transmit a supplementary synchronization signal different from the synchronization signals to the UE over a predetermined second time-frequency resource.

The supplementary synchronization signal is used for the UE to achieve downlink synchronization with an eNB and to determine a physical layer cell ID. Particularly the supplementary synchronization signal is used for a first UE to achieve downlink synchronization with the eNB and to determine the physical layer cell ID.

Both the synchronization signals and the supplementary synchronization signal correspond to the same physical layer cell ID.

It shall be noted that operations above are numbered without any limitation on a timing relationship between the two operations. A transmitting timing relationship between the synchronization signals and the supplementary synchronization signal is determined by the time-frequency resources occupied by them.

The method according to an embodiment of the present disclosure is applicable to an LTE system and particularly to an LTE network with poor coverage. Correspondingly the synchronization signals in an embodiment of the present disclosure is generated from a primary synchronization sequence and a secondary synchronization sequence, and particularly a primary synchronization sequence and a secondary synchronization sequence defined in the $3^{rd}$-Generation Partnership Project (3GPP) Release 11 and earlier releases. The supplementary synchronization signal as referred to in the embodiment of the present disclosure is generated from a supplementary primary synchronization sequence and a supplementary secondary synchronization sequence.

As described above, the synchronization signals are generated from the primary synchronization sequence and the secondary synchronization sequence.

Three primary synchronization sequences are defined in the existing protocol, and they are mapped to three physical layer IDs $N_{ID}^{(2)}$ within a physical layer cell ID group in a one-to-one relationship. The primary synchronization sequence $d_u(n)$ is generated from a Zadoff-Chu sequence (a sequence with an ideally periodical autocorrelation function and an optimally periodical cross-correlation function) in the frequency domain with the length of 62, herein a root index u of the Zadoff-Chu sequence for the primary synchronization sequence corresponds to $N_{ID}^{(2)}$ in a one-to-one manner.

The secondary synchronization sequence is derived by cyclically shifting two sequences with the length of 31, and the two sequences are combined differently in a sub-frame 0 and in a sub-frame 5, and the sequences above with the length of 31 from which the secondary synchronization sequence is generated will be referred to as supplementary m-sequences in an embodiment.

Since the UE which searches for a cell based upon the synchronization signals has no knowledge of timing of the eNB and the sequences of the synchronization signals used by the eNB, before the UE finishes the cell search, the UE searching for a cell will correlate sequences of all the synchronization signals for the respective OFDM symbols, and determine the timing of the eNB and the sequences of the synchronization signals according to correlation results. The timing of the eNB refers to a starting location of a radio frame.

Correspondingly the synchronization signals are used for determining the physical layer cell ID and timing of a cell. Particularly, after the UE which searches for a cell based upon the synchronization signals receives the synchronization signals, the UE can determine a starting location of a radio frame or of a sub-frame, because the UE knows the time-frequency resource occupied by the synchronization signals. Apparently the supplementary primary synchronization sequence defined in an embodiment of the present disclosure must not be the same as any primary synchronization sequence defined in the prior art, and the supplementary secondary synchronization sequence must not be the same as any secondary synchronization sequence defined in the prior art; otherwise, the UE which searches for a cell based upon the synchronization signals will be not able to determine the timing of the eNB.

Preferably in the method according to an embodiment of the present disclosure, before the supplementary synchronization signal different from the synchronization signals is transmitted to the UE over the second time-frequency resource, the supplementary primary synchronization sequence different from the primary synchronization sequence of the synchronization signals is generated under a predetermined rule, the length of the supplementary primary synchronization sequence is N, and the supplementary primary synchronization sequence corresponds to a physical layer ID within the physical layer cell ID group: and the supplementary secondary synchronization sequence different from the secondary synchronization sequence of the synchronization signals is generated under a predetermined rule, the length of the supplementary secondary synchronization sequence is N, and the supplementary secondary synchronization sequence corresponds to a physical layer cell ID group ID, herein N represents an integer no less than 62; and the supplementary synchronization signal is generated from the supplementary primary synchronization sequence and the supplementary secondary synchronization sequence, and the physical layer ID within the physical layer cell ID group and the physical layer cell ID group ID are used for determining the physical layer cell ID.

It shall be noted that, the predetermined rule for generating the supplementary primary synchronization sequence and the predetermined rule for generating the supplementary secondary synchronization sequence are separately predetermined rules, which can be the same rules or can be different rules.

In an embodiment of the present disclosure, the supplementary primary synchronization sequence corresponds to the physical layer ID within the physical layer cell ID group, that is, the physical layer ID within the physical layer cell ID group can be determined from the supplementary primary synchronization sequence, and the supplementary secondary synchronization sequence corresponds to the physical layer cell ID group ID, that is, the physical layer cell ID group ID can be determined from the supplementary secondary synchronization sequence.

In an embodiment of the present disclosure, a rule for generating the supplementary synchronization signal is predetermined, herein if two or more than two supplementary synchronization signals are generated, then each supplementary synchronization signal is different from one another, and rules for generating the respective supplementary synchronization signals are predetermined.

In the method according to an embodiment of the present disclosure, the supplementary synchronization signal can be generated in a number of ways, several of which will be listed below.

For the supplementary primary synchronization sequence, at least one supplementary primary synchronization sequence may be generated corresponding to the physical layer ID within the physical layer cell ID group according to a predefined equation. Alternatively, the primary synchronization sequence can be scrambled by at least one scrambling sequence, to generate at least one supplementary primary synchronization sequence, or the primary synchronization sequence can be cyclically shifted by at least one cyclical shift number, to generate at least one supplementary primary synchronization sequence. In an embodiment of the present disclosure, the so-called cyclical shift number is the number of bits by which the primary synchronization sequence is cyclically shifted.

Particularly the equation above for generating the supplementary primary synchronization sequence will not be limited to any particular equation in the present disclosure, as long as the supplementary primary synchronization sequence corresponding to the physical layer ID within the physical layer cell ID group in a one-to-one manner can be generated according to the equation. Particularly a supplementary root index different from an existing root index for generating a primary synchronization sequence can be defined, at least one group of predetermined correspondence relationship between the physical layer ID within the physical layer cell ID group and the supplementary root index can be determined, at least one supplementary root index of a frequency domain sequence (i.e., a frequency domain Zadoff-Chu sequence), corresponding to the physical layer ID within the physical layer cell ID group, can be determined according to the at least one group of predetermined correspondence relationship between the physical layer ID within the physical layer cell ID group and the supplementary root index, and further at least one supplementary primary synchronization sequence can be generated according to the equation based upon the frequency domain sequence, with the at least one supplementary root index being a parameter, herein the at least one supplementary root index is different the root index for generating the primary synchronization sequence.

Particularly, the supplementary primary synchronization sequence can be generated from the same frequency domain Zadoff-Chu sequence for generating the primary synchronization sequence, and the length of the generated supplementary primary synchronization sequence is the same as the length of the primary synchronization sequence, that is, both of the lengths are 62. The supplementary primary synchronization sequence $d_u'(n)$ can be generated in the equation of:

$$d_u'(n) = \begin{cases} e^{-j\frac{\pi u' n(n+1)}{63}} & n = 0, 1, \ldots, 30 \\ e^{-j\frac{\pi u' (n+1)(n+2)}{63}} & n = 31, 32, \ldots, 61 \end{cases}$$

For a supplementary root index u' of a frequency domain Zadoff-Chu sequence for generating the supplementary primary synchronization sequence, a one-to-one correspondence relationship between the supplementary root index u' and the physical layer ID $N_{ID}^{(2)}$ within the physical layer cell ID group can be prescribed directly; or a one-to-one correspondence relationship between the supplementary root index u' and the root index u of the frequency domain Zadoff-Chu sequence for generating the primary synchronization sequence can be prescribed, and then further a one-to-one correspondence relationship between the supplementary root index u' and the physical layer ID $N_{ID}^{(2)}$ within the physical layer cell ID group may be determined.

When the lengths of the supplementary synchronization sequences are increased, autocorrelation can be further improved, to thereby improve a detection probability; and moreover, as the lengths of the synchronization sequences are increased, a frequency band occupied by the signals also becomes wider accordingly, to thereby enhance transmitting power of the supplementary synchronization signal, so as to improve the probability of successfully performing, by the UE, correlation detection to determine the supplementary synchronization signal. Thus in an embodiment of the present disclosure, the length of the generated supplementary synchronization signal can be more than 62. Particularly as to the supplementary primary synchronization sequence, the supplementary primary synchronization sequence can be generated from a frequency domain Zadoff-Chu sequence, which is different from the frequency domain Zadoff-Chu sequence for generating the primary synchronization sequence, herein the frequency domain Zadoff-Chu sequence may be selected as long as the length of the generated supplementary primary synchronization sequence is more than 62. Correspondingly, when two or more than two supplementary primary synchronization sequences are generated, each supplementary primary synchronization sequence is generated in an equation with different parameters, that is, the supplementary root index for generating each supplementary primary synchronization sequence is different from one another.

When the primary synchronization sequence is scrambled to generate the supplementary primary synchronization sequence, the scrambling sequence in use will not be limited to any particular scrambling sequence in the present disclosure. If two or more than two supplementary primary synchronization sequences are generated, then when the two or more than two supplementary primary synchronization sequences are generated, each supplementary primary synchronization sequence is generated using a scrambling sequence different from one another.

When the primary synchronization sequence is cyclically shifted to generate the supplementary primary synchronization sequence, the cyclical shift pattern in use will not be limited to any particular cyclical shift pattern in the present disclosure. If two or more than two supplementary primary synchronization sequences are generated, then when the two or more than two supplementary primary synchronization sequences are generated, each supplementary primary synchronization sequence is generated by cyclically shifting a number of bits, and the number is different from one another.

For the supplementary secondary synchronization sequence, an equation for generating the supplementary secondary synchronization sequence can be predefined, and at least one supplementary secondary synchronization sequence can be generated based on the physical layer cell ID group ID according to the predefined equation. Alternatively, the secondary synchronization sequence can be scrambled by at least one scrambling sequence, to generate at least one supplementary secondary synchronization sequence, or the secondary synchronization sequence can be cyclically shifted by at least one cyclical shift number, to generate at least one supplementary secondary synchronization sequence.

At least one supplementary secondary synchronization sequence is generated according to a predetermined cyclical shift equation with at least one pair of associated supplementary m-sequences being parameters, herein an association relationship between the at least one pair of associated supplementary m-sequences is different from an association relationship between the two m-sequences for generating the secondary synchronization sequence.

The equation above for generating the supplementary secondary synchronization sequence will not be limited to any particular equation in the present disclosure, as long as the supplementary secondary synchronization sequence corresponding to the physical layer cell ID group ID in a one-to-one manner can be generated according to the equation. Particularly, at least one pair of associated supplementary m-sequences corresponding to the physical layer cell ID group ID of the physical layer cell ID can be determined, according to a correspondence relationship between the physical layer cell ID group ID $N_{ID}^{(1)}$ and two associated supplementary m-sequences; and at least one supplementary secondary synchronization sequence can be generated according to a predetermined cyclic shift equation with the at least one pair of associated supplementary m-sequences being parameters. If two or more than two supplementary secondary synchronization sequences are generated, then the association relationship between the two m-sequences for generating each supplementary secondary synchronization sequence is different from one another, and different from the association relationship between the two m-sequences for generating the secondary synchronization sequence.

Particularly, when the supplementary secondary synchronization sequences are generated from the two m-sequences, they can be generated particularly in the following equations, herein the two m-sequences are combined differently in a sub-frame 0 and a sub-frame 5:

$$d'(2n) = \begin{cases} s_0^{(m'_0)}(n)c_0(n) & \text{in subframe 0} \\ s_1^{(m'_1)}(n)c_0(n) & \text{in subframe 5} \end{cases}$$

$$d'(2n+1) = \begin{cases} s_1^{(m'_1)}(n)c_1(n)z_1^{(m'_0)}(n) & \text{in subframe 0} \\ s_0^{(m'_0)}(n)c_1(n)z_1^{(m'_1)}(n) & \text{in subframe 5} \end{cases}$$

herein $d'(2n)$ and $d'(2n+1)$ represent supplementary secondary synchronization sequences, $0 \leq n \leq 30$, $m'_0$ and $m'_1$ are determined from $N_{ID}^{(1)}$ particularly in the following equation, and there is a one-to-one correspondence relationship between the two associated $m'_0$ and $m'_1$, and $N_{ID}^{(1)}$:

$$m'_0 = m' \bmod 31$$
$$m'_1 = (m'_0 + \lfloor m'/31 \rfloor + 1) \bmod 31$$
$$m' = N_{ID}^{(1)} + q(q+1)/2, q = \left\lfloor \frac{N_{ID}^{(1)} + q'(q'+1)/2}{30} \right\rfloor, q' = \lfloor N_{ID}^{(1)}/30 \rfloor$$

Two s-sequences $s_0^{(m'_0)}(n)$ and $s_1^{(m'_1)}(n)$ are derived by cyclically shifting a supplementary m-sequence $\tilde{s}(n')$ differently, particularly in the equations of:

$s_0^{(m'_0)}(n) = \tilde{s}((n+m'_0) \bmod 31)$ $s_1^{(m'_1)}(n) = \tilde{s}((n+m'_1) \bmod 31)$ herein $\tilde{s}(i) = 1 - 2x(i)$, $0 \leq i \leq 30$ $x(\bar{i}+5) = (x(\bar{i}+2) + x(\bar{i})) \bmod 2$, $0 \leq \bar{i} \leq 25$ An initial condition is that $x(0)=0$, $x(1)=0$, $x(2)=0$, $x(3)=0$, $x(4)=1$.

Two scrambling sequences $c_0(n)$ and $c_1(n)$ are determined by the supplementary primary synchronization sequence and derived by cyclically shifting a supplementary m-sequence $\tilde{c}(n)$ differently, particularly in the equations of:

$c_0(n) = \tilde{c}((n+N_{ID}^{(2)}) \bmod 31)$ $c_1(n) = \tilde{c}((n+N_{ID}^{(2)}+3) \bmod 31)$ $\tilde{c}(i) = 1 - 2x(i)$, $0 \leq i \leq 30$ An initial condition is that $x(0)=0$, $x(1)=0$, $x(2)=0$, $x(3)=0$, $x(4)=1$.

Two scrambling sequences $z_1^{(m'_0)}(n)$ and $z_1^{(m'_0)}(n)$ are derived by cyclically shifting an m-sequence $\tilde{z}(n)$ differently, particularly in the equations of:

$z_1^{(m'_0)}(n) = \tilde{z}((n+(m'_0 \bmod 8)) \bmod 31)$ $z_1^{(m'_1)}(n) = \tilde{z}((n+(m'_1 \bmod 8)) \bmod 31)$ $m'_0$ and $m'_1$ can be retrieved from a lookup table, and $\tilde{z}(i) = 1 - 2x(i)$, $0 \leq i \leq 30$.

An initial condition is that $x(0)=0$, $x(1)=0$, $x(2)=0$, $x(3)=0$, $x(4)=1$.

For the two associated supplementary m-sequences for generating the supplementary secondary synchronization sequence, a one-to-one correspondence relationship between the two associated supplementary m-sequences and the physical layer cell ID group ID $N_{ID}^{(1)}$ can be prescribed directly; or a one-to-one correspondence relationship between the two associated supplementary m-sequences and the two associated m-sequences for generating the secondary synchronization sequence can be prescribed, and then a one-to-one correspondence relationship between the two associated supplementary m-sequences and the physical layer cell ID group ID $N_{ID}^{(1)}$ can be can be determined. Particularly the one-to-one correspondence relationship between the two associated supplementary m-sequences and the physical layer cell ID group ID $N_{ID}^{(1)}$ refers to a one-to-one correspondence relationship between m values of the two associated supplementary m-sequences and the physical layer cell ID group ID $N_{ID}^{(1)}$.

The length of the supplementary secondary synchronization sequence generated in the equation above is 62. In order to further increase the probability for the UE to correctly receive the supplementary synchronization signal, the length of the generated supplementary synchronization signal can be more than 62 in an embodiment of the present disclosure. Particularly as to the supplementary secondary synchronization sequence, the supplementary secondary synchronization sequence can be generated from two associated m-sequences with the lengths of N/2.

When the secondary synchronization sequence is scrambled to generate the supplementary secondary synchronization sequence, the scrambling sequence in use will not be limited in the present disclosure. When two or more than two supplementary secondary synchronization sequences are generated, each supplementary secondary synchronization sequence is generated using a scrambling sequence different from one another.

When the secondary synchronization sequence is cyclically shifted to generate the supplementary secondary synchronization sequence, the cyclical shift pattern in use will not be limited in the present disclosure. When two or more than two supplementary secondary synchronization sequences are generated, each supplementary secondary synchronization sequence is generated by cyclically shifting a number of bits, and the number is different from one another.

In the method according to an embodiment of the present disclosure, the eNB further prescribes with the first UE a mapping relationship between the supplementary synchronization signal and the second time-frequency resource. For example, a time-frequency resource pattern of a radio frame is prescribed, herein the time-frequency resource pattern describes the time-frequency resource occupied by each supplementary synchronization signal. Particularly the supplementary synchronization signal can be carried over central N sub-carriers in a system bandwidth in the frequency domain, herein N represents the length of the supplementary synchronization signal. At least one downlink idle Orthogonal Frequency Division Multiplexing (OFDM) symbol occupying the radio frame can be prescribed in the time domain. The so-called idle OFDM symbol refers to a symbol, which is not occupied by a Physical Broadcast Channel (PBCH) and the existing primary and secondary synchronization sequences, and furthermore the so-called idle OFDM symbol refers to a symbol, which is not occupied by a PBCH and the existing primary and secondary synchronization sequences, and which is not provided with a Common Reference Signal (CRS). An interval between sub-carriers in the frequency domain corresponding to OFDM symbols occupied by the supplementary synchronization signal is L*15 KHz, herein L represents an integer no less than 1, or L is more than 0 and less than 1, and a particular value thereof is predetermined by the eNB and the UE.

Correspondingly, operation 110 can be performed particularly as follows: the supplementary synchronization signal is transmitted to the UE, according to the predetermined mapping relationship between the supplementary synchronization signal and the second time-frequency resource, over time-frequency resources of OFDM symbols indicated by the mapping relationship, over the central N sub-carriers in the system bandwidth.

The supplementary synchronization signal is transmitted to the UE in the OFDM symbols indicated by the mapping relationship in the time domain particularly as follows: the supplementary synchronization signal is transmitted to the UE in OFDM symbols in n predetermined radio frame in a periodicity of m radio frames, and in each radio frame, OFDM symbols carrying the supplementary synchronization signal are determined, according to the mapping relationship between the supplementary synchronization signal and the second time-frequency resource, herein m and n represent integers no less than 1, and when m is 1, the supplementary synchronization signal is transmitted to the UE in OFDM symbols in each radio frame in the time domain; and when m is larger than 1, if m is 5 and n is 3, then the supplementary synchronization signal is transmitted to the UE in OFDM symbols in three predetermined radio frame in each periodicity of 5 radio frames, and in the three predetermined radio frames, the OFDM symbols carrying the supplementary synchronization signal are determined according to the mapping relationship above.

In an embodiment of the present disclosure, there is a one-to-one correspondence relationship between the supplementary primary synchronization sequence and the physical layer ID $N_{ID}^{(2)}$ within the physical layer cell ID group. There is a one-to-one correspondence relationship between the supplementary secondary synchronization sequence and the physical layer cell ID group ID $N_{ID}^{(1)}$. Thus the physical layer cell ID can be determined uniquely by the supplementary synchronization signal. The first UE can determine the physical layer cell ID, after performing correlation detection to determine the supplementary synchronization signal. Moreover, if the second time-frequency resource occupied by the supplementary synchronization signal are predetermined by the eNB and the UE, then the first UE can determine the timing of the eNB, from the supplementary synchronization signal and the time-frequency resources occupied by the supplementary synchronization signal, after performing correlation detection to determine the supplementary synchronization signal. Thus, if the first UE may correctly receive the supplementary synchronization signal, then the UE may finish cell search based upon the supplementary synchronization signal. Alternatively, the first UE can determine the physical layer cell ID and the timing from both the synchronization signals and the supplementary synchronization signal.

As can be apparent from the description above of the method according to an embodiment of the present disclosure, the eNB needs to prescribe with the first UE the second time-frequency resource occupied by the supplementary synchronization signal before transmitting the supplementary synchronization signal. Since the second UE does not prescribe any corresponding second time-frequency resource with the eNB, that is, the UE has no capability to receive the supplementary synchronization signal, if the eNB schedules time-frequency resources including the supplementary synchronization signal for the second UE, then the second UE will fail to decode the supplementary synchronization signal. Correspondingly, when it is judged that the UE can not know in advance the second time-frequency resource occupied by the supplementary synchronization signal, time-frequency resources different from the second time-frequency resource can be further scheduled for the UE, or time-frequency resources including the second time-frequency resource can be scheduled for the UE, and the UE can be notified of the second time-frequency resource.

Particularly the category of the UE can be determined by detecting a version number of the UE.

The second time-frequency resource occupied by the supplementary synchronization signal will not be scheduled for the second UE, so that the second UE can be avoided from failing to decoding the supplementary synchronization signal. Alternatively, the second UE can be notified of the second time-frequency resource, so that the second UE can remove the second time-frequency resource occupied by the supplementary synchronization signal when receiving data, to thereby correctly receive downlink data transmitted by the eNB.

The signal transmitting method according to an embodiment of the present disclosure will be described below in details in connection with a particular application scenario thereof.

The supplementary primary synchronization sequence is generated from the same frequency domain Zadoff-Chu sequence as the equation for generating the existing primary synchronization sequence, but the supplementary root index u' for the frequency domain Zadoff-Chu sequence is different from the root index u of the frequency domain Zadoff-Chu sequence for generating the primary synchronization sequence, and the one-to-one correspondence relationship between the supplementary root index u', the root index u and the physical layer cell $N_{ID}^{(2)}$ within the physical layer cell ID group is as depicted in Table 1.

TABLE 1

| $N_{ID}^{(2)}$ | Supplementary root index u' | Root index u |
|---|---|---|
| 0 | 25 | 1 |
| 1 | 29 | 2 |
| 2 | 34 | 3 |

It shall be noted that the values of the supplementary root index u' in Table 1 are merely illustrative but not limiting, and the particular value thereof can be determined by the cross-correlation between the generated supplementary primary synchronization sequence and the primary synchronization sequence. Preferably, there is low cross-correlation between supplementary primary synchronization sequences generated from the determined supplementary root index u', and there is low cross-correlation between the supplementary primary synchronization sequence generated from the determined supplementary root index u' and the primary synchronization sequence.

It shall be noted that the generation of the supplementary primary synchronization sequence from the same frequency domain Zadoff-Chu sequence as the equation for generating the existing primary synchronization sequence is merely exemplary, alternatively, the supplementary primary synchronization sequence may be generated according to a predefined equation, and in the predefined equation the physical layer ID within the physical layer cell ID group including the physical layer cell ID is a parameter. Alternatively, the supplementary primary synchronization sequence can be generated by scrambling or cyclically shifting the primary synchronization sequence. Alternatively, in an implementation, the supplementary primary synchronization sequence may be generated according to a predefined equation, and in the predefined equation the physical layer ID within the physical layer cell ID group including the physical layer cell ID is a parameter, and it will be further described below by way of an example.

The length of the supplementary primary synchronization sequence is defined as N (N represents an even number more than 62), and the supplementary primary synchronization sequence $d_{u'}(n)$ is generated in the equation of:

$$d_{u'}(n) = \begin{cases} e^{-j\frac{\pi u' n(n+1)}{N+1}} & n = 0, 1, \ldots, \frac{N}{2} - 1 \\ e^{-j\frac{\pi u' (n+1)(n+2)}{N+1}} & n = \frac{N}{2}, 32, \ldots, N-1 \end{cases}$$

Particularly the supplementary root index u' of the supplementary primary synchronization sequence corresponds to the physical layer ID $N_{ID}^{(2)}$ within the physical layer cell ID group in a one-to-one manner.

When the supplementary secondary synchronization sequence is generated from two supplementary m-sequences, the association relationship between the two associated supplementary m-sequences in use (particularly the association relationship between the m values $m_0'$ and $m_1'$) is different from the association relationship between the two associated m-sequences for generating the secondary synchronization sequence (particularly the association relationship between the m values $m_0$ and $m_1$). Taking the physical layer cell ID group IDs $N_{ID}^{(1)}$ being 0~10 as an example, the one-to-one correspondence relationship between the associated m values $m_0$ and $m_1$, the associated supplementary m values $m_0'$ and $m_1'$, and the physical layer cell ID group ID $N_{ID}^{(1)}$ is as depicted in Table 2.

TABLE 2

| $N_{ID}^{(1)}$ | $m_0$ | $m_1$ | $m_0'$ | $m_1'$ |
|---|---|---|---|---|
| 0 | 0 | 1 | 0 | 8 |
| 1 | 1 | 2 | 1 | 9 |
| 2 | 2 | 3 | 2 | 10 |
| 3 | 3 | 4 | 3 | 11 |
| 4 | 4 | 5 | 4 | 12 |
| 5 | 5 | 6 | 5 | 13 |
| 6 | 6 | 7 | 6 | 14 |
| 7 | 7 | 8 | 7 | 15 |
| 8 | 8 | 9 | 8 | 16 |
| 9 | 9 | 10 | 9 | 17 |
| 10 | 10 | 11 | 10 | 18 |

It shall be noted that the values of the two associated supplementary m values $m_0'$ and $m_1'$ in Table 2 are merely exemplary but not limiting, and the values thereof will not be limited to any particular values in the present disclosure, as long as the association relationship between $m_0'$ and $m_1'$ is different from that between $m_0$ and $m_1$.

It shall be noted that the generation of the supplementary secondary synchronization sequence from two supplementary m-sequences is only exemplary, but alternatively an equation for generating the supplementary secondary synchronization sequence can be predefined, and the supplementary secondary synchronization sequence can be generated in the equation with the physical layer cell ID group ID of the physical layer cell ID being a parameter. Alternatively, the secondary synchronization sequence can be scrambled or cyclically shifted to generate the supplementary secondary synchronization sequence.

It shall be noted that the generation of one supplementary primary synchronization sequence and one supplementary secondary synchronization sequence has been described above by way of an example. More than one different primary synchronization sequence and more than one different secondary synchronization sequence can be further generated as in the method above.

Still taking as an example the generation of the supplementary primary synchronization sequence from the frequency domain Zadoff-Chu sequence, if two supplementary primary synchronization sequences need to be generated, then a first root index of the frequency domain Zadoff-Chu sequence corresponding to the physical layer ID within the physical layer cell ID group including the physical layer cell ID is determined, according to a predetermined first correspondence relationship between the physical layer ID within the physical layer cell ID group and the supplementary root index, and a first supplementary primary synchronization sequence is generated from the frequency domain Zadoff-Chu sequence based upon the first root index: and a second root index of the frequency domain Zadoff-Chu sequence corresponding to the physical layer ID within the physical layer cell ID group including the physical layer cell ID is determined, according to a predetermined second correspondence relationship between the physical layer ID within the physical layer cell ID group and the supplementary root index, and a second supplementary primary synchronization sequence is generated from the frequency domain Zadoff-Chu sequence based upon the second root index.

When the first supplementary primary synchronization sequence and the second supplementary primary synchronization sequence are generated from the frequency domain Zadoff-Chu sequence, both the supplementary root index u' for the frequency domain Zadoff-Chu sequence when the first supplementary primary synchronization sequence is generated, and the supplementary root index u" for the frequency domain Zadoff-Chu sequence when the second supplementary primary synchronization sequence is generated are different from the root index u of the frequency domain Zadoff-Chu sequence for generating the PSS, and the one-to-one correspondence relationship between the supplementary root index u', the supplementary root index u", the root index u, and the physical layer ID $N_{ID}^{(2)}$ within the physical layer cell ID group is as depicted in Table 3.

TABLE 3

| $N_{ID}^{(2)}$ | Root index u | Supplementary root index u' | Supplementary root index u" |
|---|---|---|---|
| 0 | 25 | 1 | 4 |
| 1 | 29 | 2 | 5 |
| 2 | 34 | 3 | 6 |

It shall be noted that the values of the supplementary root index u' and the supplementary root index u" in Table 3 are merely illustrative but not limiting, and the particular values thereof can be determined by the cross-correlation between the generated supplementary primary synchronization sequences and the primary synchronization sequence. Preferably there is low cross-correlation between the first supplementary primary synchronization sequence generated from the determined supplementary root index u', and the second supplementary primary synchronization sequence generated from the determined supplementary root index u", and between them and the primary synchronization sequence.

Still taking as an example the generation of the supplementary secondary synchronization sequence from two associated m-sequences, two m-sequences corresponding to the physical layer cell ID group ID of the physical layer cell ID is determined, according to the correspondence relationship between the physical layer cell ID group ID $N_{ID}^{(1)}$ and the two associated supplementary m-sequences, and a first supplementary secondary synchronization sequence is generated from the two m-sequences, herein the association relationship between the two m-sequences is different from the association relationship between the two m-sequences for generating the secondary synchronization signal; and other two m-sequences corresponding to the physical layer cell ID group ID of the physical layer cell ID is determined, according to the correspondence relationship between the physical layer cell ID group ID $N_{ID}^{(1)}$ and the other two associated supplementary m-sequences, and a second supplementary secondary synchronization sequence is generated from said other two m-sequences, herein the association relationship between said other two m-sequences is different from the association relationship between the two m-sequences for generating the secondary synchronization signal, and the association relationship between the two m-sequences for generating the first supplementary secondary synchronization sequence is different from the association relationship between the two m-sequences for generating the second supplementary secondary synchronization sequence.

When the first supplementary secondary synchronization sequence is generated from the two m-sequences, the association relationship, between the m values $m_0'$ and $m_1'$ of the two associated supplementary m-sequences in use, is different from that between the m values $m_0$ and $m_1$ of the two associated m-sequences for generating the secondary synchronization sequence. When the second supplementary secondary synchronization sequence is generated from the other two m-sequences, the association relationship between the m values $m_0''$ and $m_1''$ of the two associated supplementary m-sequences in use is also different from that between the m values $m_0$ and $m_1$ of the two associated m-sequences for generating the secondary synchronization sequence. Taking the physical layer cell ID group IDs $N_{ID}^{(1)}$ being 0~10 as an example, the one-to-one correspondence relationship between the associated m values $m_0$ and $m_1$, the associated supplementary m values $m_0'$ and $m_1'$, the associated supplementary m values $m_0''$ and $m_1''$, and the physical layer cell ID group ID $N_{ID}^{(1)}$ is as depicted in Table 4.

TABLE 4

| $N_{ID}^{(1)}$ | $m_0$ | $m_1$ | $m_0'$ | $m_1'$ | $m_0''$ | $m_1''$ |
|---|---|---|---|---|---|---|
| 0 | 0 | 1 | 0 | 8 | 0 | 9 |
| 1 | 1 | 2 | 1 | 9 | 1 | 10 |
| 2 | 2 | 3 | 2 | 10 | 2 | 11 |
| 3 | 3 | 4 | 3 | 11 | 3 | 12 |
| 4 | 4 | 5 | 4 | 12 | 4 | 13 |
| 5 | 5 | 6 | 5 | 13 | 5 | 14 |
| 6 | 6 | 7 | 6 | 14 | 6 | 15 |
| 7 | 7 | 8 | 7 | 15 | 7 | 16 |
| 8 | 8 | 9 | 8 | 16 | 8 | 17 |
| 9 | 9 | 10 | 9 | 17 | 9 | 18 |
| 10 | 10 | 11 | 10 | 18 | 10 | 19 |

It shall be noted that the values of the two associated supplementary m values $m_0'$ and $m_1'$, and the values of the other two associated supplementary m values $m_0''$ and $m_1''$ in Table 4 are merely exemplary but not limiting, and the values thereof will not be limited to any particular values in the present disclosure as long as the association relationship between $m_0'$ and $m_1'$, and the association relationship between $m_0''$ and $m_1''$, are different from the association relationship between $m_0$ and $m_1$.

As described above, the eNB can further prescribe with the UE, performing cell search based upon the supplementary synchronization signal, the mapping relationship between the supplementary synchronization signal and the second time-frequency resource.

Figure 2:
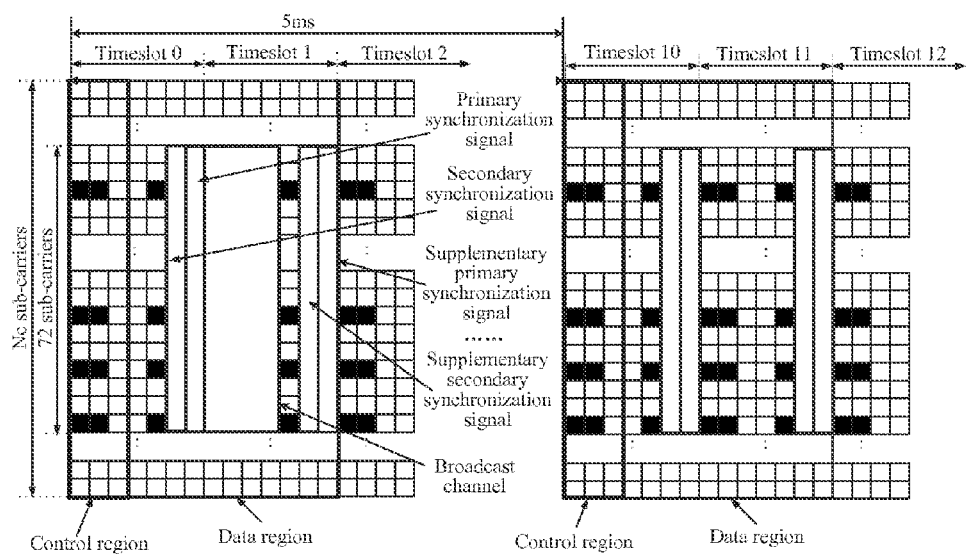
FIG. 2 illustrates a schematic diagram of a first time-frequency resource occupancy according to an embodiment of the present disclosure.

Taking as an example the occupancy of time-frequency resources in an FDD system by one supplementary synchronization signal in the schematic diagram illustrated in FIG. 2, the eNB prescribes with the UE, which searches for a cell based upon the supplementary synchronization signal, that a primary synchronization sequence, a secondary synchronization sequence, a supplementary primary synchronization sequence and a supplementary secondary synchronization sequence are carried over central 62 sub-carriers in a system bandwidth in the frequency domain; and a primary synchronization sequence is carried in last OFDM symbols in a timeslot 0 and a timeslot 10, a secondary synchronization sequence is carried in second last OFDM symbols in the timeslot 0 and the timeslot 10, a supplementary primary synchronization sequence is carried in the last OFDM symbol in each timeslot other than the timeslot 0 and the timeslot 10, and a supplementary secondary synchronization sequence is carried in a second last OFDM symbol in each timeslot other than the timeslot 0 and the timeslot 10 in the time domain. In this embodiment, the synchronization signals can be transmitted at a frequency raised by a factor of 20, to thereby greatly increase the probability for the UE to correctly perform cell search, so as to shorten a period of time for cell search and lower the requirement on a buffer of the UE. However, when transmitting frequency of the synchronization signals is raised by a factor of 20, the cost of an overhead of system resources also increased by a factor of 20.

The eNB can prescribe with the UE which searches for a cell based upon the supplementary synchronization signal that the supplementary synchronization signal is transmitted in each radio frame according to the mapping relationship illustrated in FIG. 2. In order to balance the overhead of the system resources against a buffer overhead of the UE, the eNB can alternatively prescribe with the UE which searches for a cell based upon the supplementary synchronization signal that the supplementary synchronization signal is transmitted in n radio frames in a periodicity of m radio frames, where m>1, according to the mapping relationship illustrated in FIG. 2.

Figure 3:
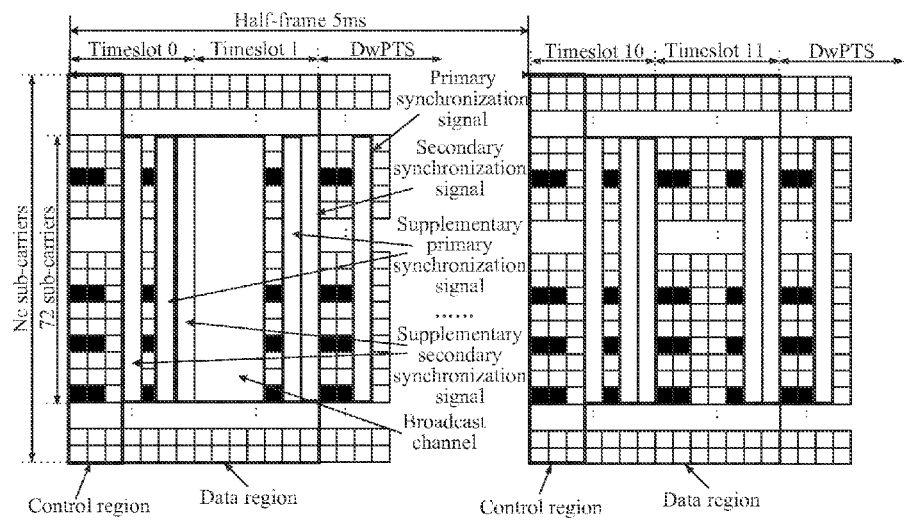
FIG. 3 illustrates a schematic diagram of a second time-frequency resource occupancy according to an embodiment of the present disclosure.

Taking as an example the occupancy of time-frequency resources in a TDD system in the schematic diagram illustrated in FIG. 3, the eNB prescribes with the UE which searches for a cell based upon the supplementary synchronization signal that a primary synchronization sequence, a secondary synchronization sequence, a first supplementary primary synchronization sequence, a second supplementary primary synchronization sequence, a first supplementary secondary synchronization sequence, and a second supplementary secondary synchronization sequence are carried over central 62 sub-carriers in a system bandwidth in the frequency domain; and a supplementary secondary synchronization sequence is carried in fourth OFDM symbols and seventh OFDM symbols in first timeslots in a sub-frame 0 and a sub-frame 5 (the same supplementary secondary synchronization sequence can be carried in the two OFDM symbols, or two different supplementary secondary synchronization sequences can be carried in the two OFDM symbols, and mapping relationships between the respective supplementary secondary synchronization sequences and the OFDM symbols can be prescribed particularly), and a supplementary primary synchronization sequence is carried in sixth OFDM symbols in the first timeslots and sixth OFDM symbols in second timeslots in the sub-frame 0 and the sub-frame 5 (the same supplementary primary synchronization sequence can be carried in the two OFDM symbols, or two different supplementary primary synchronization sequences can be carried in the two OFDM symbols, and mapping relationships between the respective supplementary primary synchronization sequences and the OFDM symbols can be prescribed particularly) in the time domain.

Figure 4:
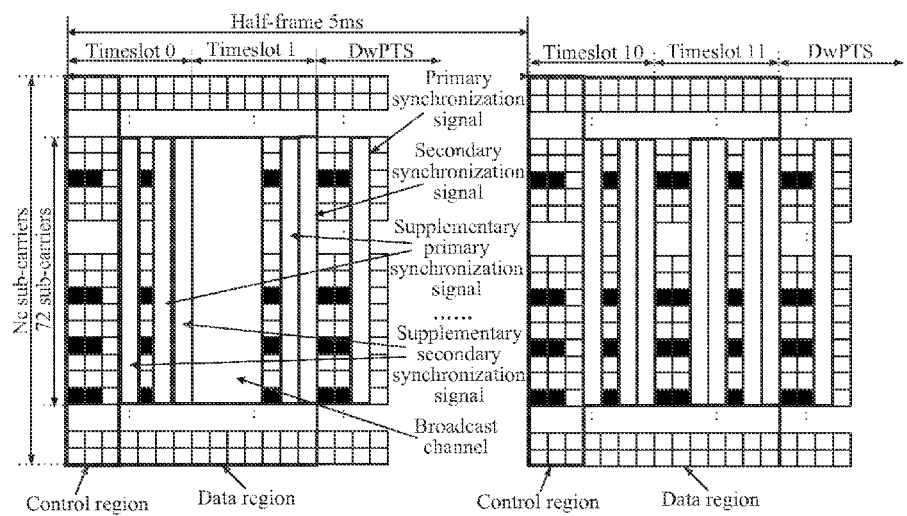
FIG. 4 illustrates a schematic diagram of a third time-frequency resource occupancy according to an embodiment of the present disclosure.

The eNB can prescribe with the UE, which searches for a cell based upon the supplementary synchronization signal, that the supplementary synchronization signal is transmitted in each radio frame according to the mapping relationship illustrated in FIG. 4. In order to balance an overhead of system resources against a buffer overhead of the UE, the eNB can alternatively prescribe with the UE, which searches for a cell based upon the supplementary synchronization signal, that the supplementary synchronization signal is transmitted in n radio frames in a periodicity of m radio frames, with m>1, according to the mapping relationship illustrated in FIG. 3.

In the schematic diagram of the occupancy of time-frequency resources in a TDD system illustrated in FIG. 3, there is the same pattern of the second time-frequency resource in both the 5 ms half-frames. Optionally the eNB can alternatively prescribe with the UE different patterns of the second time-frequency resource in the two 5 ms half-frames.

Taking as an example the occupancy of time-frequency resources in a TDD system in the schematic diagram illustrated in FIG. 4, the eNB prescribes with the UE, which searches for a cell based upon the supplementary synchronization signal, that a primary synchronization sequence, a secondary synchronization sequence, a first supplementary primary synchronization sequence, a second supplementary primary synchronization sequence, a first supplementary secondary synchronization sequence, and a second supplementary secondary synchronization sequence are carried over central 62 sub-carriers in a system bandwidth in the frequency domain; and a supplementary secondary synchronization sequence is carried in a fourth OFDM symbol and a seventh OFDM symbol in a first timeslot in a sub-frame 0, a supplementary primary synchronization sequence is carried in a sixth OFDM symbol in the first timeslot and a sixth OFDM symbol in a second timeslot in the sub-frame 0, a supplementary secondary synchronization sequence is carried in a fourth OFDM symbol and a seventh OFDM symbol in a first timeslot and a fourth OFDM symbol in a second timeslot in a sub-frame 5, and a supplementary primary synchronization sequence is carried in a sixth OFDM symbol in the first timeslot and a third OFDM symbol and a sixth OFDM symbol in the second timeslot in the sub-frame 5. The supplementary primary synchronization sequence carried in the OFDM symbols in which the supplementary primary synchronization sequence is carried may be the same or different, particularly as prescribed. The supplementary secondary synchronization sequence carried in the OFDM symbols in which the supplementary secondary synchronization sequence is carried may be the same or different, particularly as prescribed.

The eNB can prescribe with the UE, which searches for a cell based upon the supplementary synchronization signal, that the supplementary synchronization signal is transmitted in each radio frame according to the mapping relationship illustrated in FIG. 4. In order to balance an overhead of system resources against a buffer overhead of the UE, the eNB can alternatively prescribe with the UE, which searches for a cell based upon the supplementary synchronization signal, that the supplementary synchronization signal is transmitted in n radio frames in a periodicity of m radio frames, with m>1, according to the mapping relationship illustrated in FIG. 4.

In the respective embodiments above, the lengths of the supplementary primary synchronization sequence and the supplementary secondary synchronization sequence are 62, and they occupy the central 62 sub-carriers in the system bandwidth in the frequency domain. If the lengths N of the generated supplementary primary synchronization sequence and supplementary secondary synchronization sequence are larger than 62, then they occupy central N sub-carriers in the system bandwidth in the frequency domain. Moreover each sub-carrier interval in the system bandwidth over existing frequency resources is 15 KHz. In order to enhance transmitting power of the synchronization signals and the supplementary synchronization signal, an interval of L*15 KHz between respective sub-carriers in the frequency domain corresponding to the OFDM symbols occupied by the supplementary synchronization signal can be further prescribed, herein L represents an integer more than 1, or L is more than 0 and less than 1.

Figure 5:
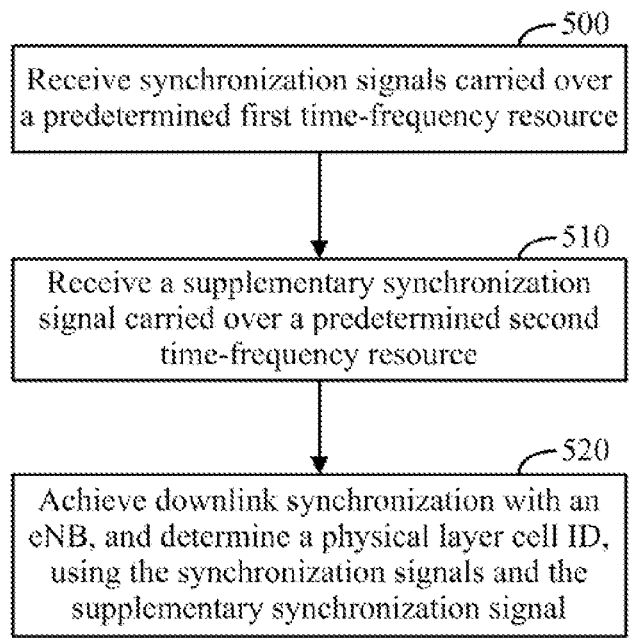
FIG. 5 illustrates a flow chart of a signal receiving method according to an embodiment of the present disclosure.

An embodiment of the present disclosure further provides a signal receiving method, and FIG. 5 illustrates an implementation thereof particularly including the following operations:

Operation 500: receive synchronization signals carried over a predetermined first time-frequency resource;

Operation 510: receive a supplementary synchronization signal carried over a predetermined second time-frequency resource; and Operation 520: achieve downlink synchronization with an eNB, and determine a physical layer cell ID, using the synchronization signals and the supplementary synchronization signal, herein both the synchronization signals and the supplementary synchronization signal correspond to the same physical layer cell ID.

Preferably achieving downlink synchronization with the eNB, and determining the physical layer cell ID, using the synchronization signals and the supplementary synchronization signal is performed particularly as follows:

achieving downlink synchronization with the eNB using the synchronization signals and the supplementary synchronization signal, according to a predetermined mapping relationship between the supplementary synchronization signal and the second time-frequency resource, and a predetermined mapping relationship between the synchronization signals and the first time-frequency resource; and determining the physical layer cell ID using the supplementary synchronization signal according to a predetermined correspondence relationship between the supplementary synchronization signal and the physical layer cell ID, or determining the physical layer cell ID using the synchronization signals, according to a predetermined correspondence relationship between the synchronization signals and the physical layer cell ID.

Figure 6:
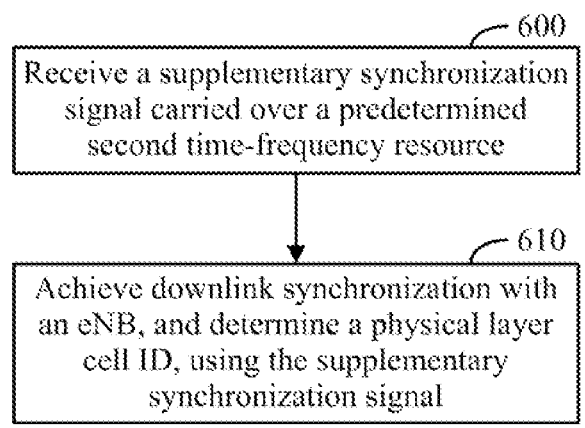
FIG. 6 illustrates a flow chart of another signal receiving method according to an embodiment of the present disclosure.

An embodiment of the present disclosure further provides another signal receiving method, and FIG. 6 illustrates an implementation thereof particularly including the following operations:

Operation 600: receive a supplementary synchronization signal carried over a predetermined second time-frequency resource; and Operation 610: achieve downlink synchronization with an eNB, and determine a physical layer cell ID, using the supplementary synchronization signal.

The method is particularly applicable to a scenario where more than one supplementary synchronization signal is carried in a radio frame. Since more than one supplementary synchronization signal is carried in a radio frame, the UE given the same coverage can perform correlation detection to achieve downlink synchronization with the eNB and to determine the physical layer cell ID in a shortened period of time for cell search, while lowering the amount of buffered data as compared with the prior art.

Preferably achieving downlink synchronization with the eNB, and determining the physical layer cell ID, using the supplementary synchronization signal is performed particularly as follows:

achieving downlink synchronization with the eNB using the supplementary synchronization signal, according to a predetermined mapping relationship between the supplementary synchronization signal and the second time-frequency resource; and determining the physical layer cell ID using the supplementary synchronization signal, according to a predetermined correspondence relationship between the supplementary synchronization signal and the physical layer cell ID.

Figure 7:
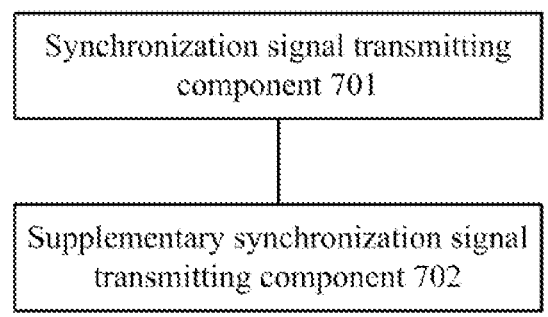
FIG. 7 illustrates a schematic structural diagram of an eNB according to an embodiment of the present disclosure.

Based upon the same inventive idea as the signal transmitting method above, an embodiment of the present disclosure further provides an eNB, and FIG. 7 illustrates a structure thereof particularly including the following components:

a synchronization transmitting component 701 configured to transmit synchronization signals to a UE over a predetermined first time-frequency resource; and a supplementary synchronization transmitting component 702 configured to transmit a supplementary synchronization signal different from the synchronization signals to the UE over a predetermined second time-frequency resource, herein the supplementary synchronization signal is used for the UE to achieve downlink synchronization with an eNB and to determine a physical layer cell ID, and both the synchronization signals and the supplementary synchronization signal correspond to the same physical layer cell ID.

Preferably the eNB according to the embodiment of the present disclosure further includes:

a supplementary primary synchronization sequence generating component configured to generate a supplementary primary synchronization sequence different from a primary synchronization sequence of the synchronization signals under a predetermined rule, herein the length of the supplementary primary synchronization sequence is N, and the supplementary primary synchronization sequence corresponds to a physical layer ID in a physical layer cell ID group; and a supplementary secondary synchronization sequence generating component configured to generate a supplementary secondary synchronization sequence different from a secondary synchronization sequence of the synchronization signals under a predetermined rule, where the length of the supplementary secondary synchronization sequence is N, and the supplementary secondary synchronization sequence corresponds to a physical layer cell ID group ID, herein N represents an integer no less than 62; and the supplementary synchronization signal is generated from the supplementary primary synchronization sequence and the supplementary secondary synchronization sequence, and the physical layer ID within the physical layer cell ID group and the physical layer cell ID group ID are used for determining the physical layer cell ID.

Preferably the supplementary primary synchronization sequence generating component is configured:

to generate at least one supplementary primary synchronization sequence corresponding to the physical layer ID within the physical layer cell ID group according to a predefined equation; or to scramble the primary synchronization sequence by at least one scrambling sequence to generate at least one supplementary primary synchronization sequence; or to cyclically shift the primary synchronization sequence by at least one cyclical shift number to generate at least one supplementary primary synchronization sequence.

Preferably when the at least one supplementary primary synchronization sequence different from each other is generated corresponding to the physical layer ID within the physical layer cell ID group according to the predefined equation, the supplementary primary synchronization sequence generating component is configured:

to generate at least one supplementary root index of a sequence in the frequency domain corresponding to the physical layer ID within the physical layer cell ID group, according to at least one group of predetermined correspondence relationship between the physical layer ID within the physical layer cell ID group and the supplementary root index; and to generate the at least one supplementary primary synchronization sequence according to the equation based upon the frequency domain sequence, with the at least one supplementary root index being a parameter, herein the at least one supplementary root index is different a root index for generating the primary synchronization sequence.

Preferably the supplementary secondary synchronization sequence generating component is configured:

to generate at least one supplementary secondary synchronization sequence based on the physical layer cell ID group ID according to a predefined equation; or to scramble the secondary synchronization sequence to generate at least one supplementary secondary synchronization sequence; or to cyclically shift the secondary synchronization sequence to generate at least one supplementary secondary synchronization sequence.

Preferably when at least one supplementary secondary synchronization sequence is generated based on the physical layer cell ID group ID according to the predefined equation, the supplementary secondary synchronization sequence generating component is configured:

to determine at least one pair of associated supplementary m-sequences corresponding to the physical layer cell ID group ID according to a correspondence relationship between the physical layer cell ID group ID and the two associated supplementary m-sequences, and to generate at least one supplementary secondary synchronization sequence according to a predetermined cyclical shift equation with the at least one pair of associated supplementary m-sequences being parameters, herein an association relationship between the at least one pair of associated supplementary m-sequences is different from an association relationship between two m-sequences for generating the secondary synchronization sequence.

Preferably the supplementary synchronization signal generating component 702 is configured:

to transmit the supplementary synchronization signal to the UE, according to a predetermined mapping relationship between the supplementary synchronization signal and the second time-frequency resource, over time-frequency resources of OFDM symbols indicated by the mapping relationship, over central N sub-carriers in a system bandwidth, herein there is an interval of L*15 KHz between sub-carriers corresponding to the OFDM symbols indicated by the mapping relationship, and L represents an integer no less than 1, or L is more than 0 and less than 1.

Preferably the OFDM symbols indicated by the mapping relationship are not occupied by a physical broadcast channel or the synchronization signals and carry no common reference signal.

Preferably when the supplementary synchronization signal is transmitted to the UE in the OFDM symbols indicated by the mapping relationship in the time domain, the supplementary synchronization signal transmitting component 902 is configured:

to transmit the supplementary synchronization signal to the UE in OFDM symbols in n predetermined radio frame in a periodicity of m radio frames, herein in each radio frame, OFDM symbols carrying the supplementary synchronization signal are determined, according to the mapping relationship between the supplementary synchronization signal and the second time-frequency resource, wherein m and n represent integers no less than 1.

Preferably the eNB according to an embodiment of the present disclosure further includes a time-frequency resource scheduling component configured, when it is judged that the UE can not know in advance the second time-frequency resource occupied by the supplementary synchronization signal:

to schedule time-frequency resources different from the second time-frequency resource for the UE;

or to schedule time-frequency resources including the second time-frequency resource for the UE, and informing the second time-frequency resource to the UE.

Based upon the same inventive idea as the signal receiving method above, an embodiment of the present disclosure further provides a UE structurally embodied particularly as follows:

a first signal receiving component configured to receive synchronization signals carried over a predetermined first time-frequency resource, and to receive a supplementary synchronization signal carried over a predetermined second time-frequency resource; and a first cell searching component configured to achieve downlink synchronization with an eNB, and to determine a physical layer cell ID, using the synchronization signals and the supplementary synchronization signal, where both the synchronization signals and the supplementary synchronization signal correspond to the same physical layer cell ID.

Preferably the first signal receiving component is configured:

to achieve downlink synchronization with the eNB using the synchronization signals and the supplementary synchronization signal, according to a predetermined mapping relationship between the supplementary synchronization signal and the second time-frequency resource, and a predetermined mapping relationship between the synchronization signals and the first time-frequency resource; and to determine the physical layer cell ID using the supplementary synchronization signal, according to a predetermined correspondence relationship between the supplementary synchronization signal and the physical layer cell ID, or to determine the physical layer cell ID using the synchronization signals according to a predetermined correspondence relationship between the synchronization signals and the physical layer cell ID.

Based upon the same inventive idea as the signal receiving method above, an embodiment of the present disclosure further provides another UE structurally embodied particularly as follows:

a second signal receiving component configured to receive a supplementary synchronization signal carried over a predetermined second time-frequency resource; and A second cell searching component configured to achieve downlink synchronization with an eNB, and to determine a physical layer cell ID, using the supplementary synchronization signal.

The second signal receiving component is configured:

to achieve downlink synchronization with the eNB using the supplementary synchronization signal according to a predetermined mapping relationship between the supplementary synchronization signal and the second time-frequency resource; and to determine the physical layer cell ID using the supplementary synchronization signal, according to a predetermined correspondence relationship between the supplementary synchronization signal and the physical layer cell ID.

An embodiment of the present disclosure further provides an eNB including a processor and a data transceiving interface, where:

The processor is configured to transmit synchronization signals to a UE over a predetermined first time-frequency resource; and to transmit a supplementary synchronization signal different from the synchronization signals to the UE over a predetermined second time-frequency resource, herein both the synchronization signals and the supplementary synchronization signal correspond to the same physical layer cell ID; and The data transceiving interface is configured to communicate data with the UE.

An embodiment of the present disclosure further provides a UE including a processor and a data transceiving interface, where:

The processor is configured to receive synchronization signals carried over a predetermined first time-frequency resource, and to receive a supplementary synchronization signal carried over a predetermined second time-frequency resource; and to achieve downlink synchronization with an eNB, and to determine a physical layer cell ID, using the synchronization signals and the supplementary synchronization signal, herein both the synchronization signals and the supplementary synchronization signal correspond to the same physical layer cell ID; or The processor is configured to receive a supplementary synchronization signal carried over a predetermined second time-frequency resource; and to achieve downlink synchronization with an eNB, and to determine a physical layer cell ID, using the supplementary synchronization signal: and The data transceiving interface is configured to communicate data with the eNB.

Figure 8:
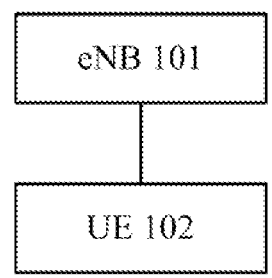
FIG. 8 illustrates a schematic structural diagram of a communication system according to an embodiment of the present disclosure.

Based upon the same inventive idea as the methods above, an embodiment of the present disclosure further provides a communication system, and FIG. 8 illustrates a structure thereof embodied particularly as follows:

An eNB 101 is configured to transmit synchronization signals to a UE over a predetermined first time-frequency resource; and to transmit a supplementary synchronization signal different from the synchronization signals to the UE over a predetermined second time-frequency resource, herein both the synchronization signals and the supplementary synchronization signal correspond to the same physical layer cell ID; and The UE 102 is configured to receive the synchronization signals carried over the predetermined first time-frequency resource, to receive the supplementary synchronization signal carried over the predetermined second time-frequency resource, and to achieve downlink synchronization with the eNB, and to determine the physical layer cell ID, using the synchronization signals and the supplementary synchronization signal: or to receive the supplementary synchronization signal carried over the predetermined second time-frequency resource, and to achieve downlink synchronization with the eNB, and to determine the physical layer cell ID, using the supplementary synchronization signal.

In the cNB and the communication system according to embodiments of the present disclosure, the cNB transmits the supplementary synchronization signal in addition to the synchronization signals, which means that the synchronization signals are transmitted at a higher frequency. In the case of poor network coverage, the synchronization signals can be transmitted at a higher frequency, so that the probability for the UE to achieve cell search by performing correlation detection on the same number of signals can be increased, to thereby achieve cell search, thus shortening a period of time it takes for the UE to achieve the cell search and also lowering the amount of data buffered by the UE and hence the requirement on a buffer of the UE.

Those skilled in the art shall appreciate that the embodiments of the present disclosure can be embodied as a method, a system or a computer program product. Therefore the present disclosure can be embodied in the form of an all-hardware embodiment, an all-software embodiment or an embodiment of software and hardware in combination. Furthermore the present disclosure can be embodied in the form of a computer program product embodied in one or more computer useable storage mediums (including but not limited to a disk memory, a CD-ROM, an optical memory, etc.) in which computer useable program codes are contained.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the present disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the present disclosure.

Evidently those skilled in the art can make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

The invention claimed is:

1. A signal transmitting method, comprising:
   transmitting synchronization signals to a User Equipment, UE, over a predetermined first time-frequency resource; and
   transmitting a supplementary synchronization signal different from the synchronization signals to the UE over a predetermined second time-frequency resource, wherein both the synchronization signals and the supplementary synchronization signal correspond to the same physical layer cell identifier;
   so that the UE achieves downlink synchronization with an eNB, and determines a physical layer cell identifier by using the synchronization signals and the supplementary synchronization signal, wherein both the synchronization signals and the supplementary synchronization signal correspond to the same physical layer cell identifier, wherein before the transmitting the supplementary synchronization signal different from the synchronization signals to the UE over the predetermined second time-frequency resource, the method further comprises:
   generating a supplementary primary synchronization sequence for the supplementary synchronization signal under a predetermined rule, the supplementary primary synchronization sequence different from a primary synchronization sequence of the synchronization signals, wherein the length of the supplementary primary synchronization sequence is N, and the supplementary primary synchronization sequence corresponds to a physical layer identifier within a physical layer cell identifier group; and
   generating a supplementary secondary synchronization sequence for the supplementary synchronization signal under a predetermined rule, the supplementary secondary synchronization sequence different from a secondary synchronization sequence of the synchronization signals, wherein the length of the supplementary secondary synchronization sequence is N, and the supplementary secondary synchronization sequence corresponds to a physical layer cell identifier group identifier, wherein N represents an integer no less than 62; and the supplementary synchronization signal is generated from the supplementary primary synchronization sequence and the supplementary secondary synchronization sequence, and the physical layer identifier within the physical layer cell identifier group and the physical layer cell identifier group identifier are used for determining the physical layer cell identifier;
   wherein the generating the supplementary primary synchronization sequence for the supplementary synchronization signal under the predetermined rule comprises:
   generating at least one supplementary primary synchronization sequence corresponding to the physical layer identifier within the physical layer cell identifier group according to a predefined equation;
   wherein the generating the at least one supplementary primary synchronization sequence corresponding to the physical layer identifier within the physical layer cell identifier group according to the predefined equation comprises:
   generating at least one supplementary root index corresponding to the physical layer identifier within the physical layer cell identifier group, according to at least one group of predetermined correspondence relationship between the physical layer identifier within the physical layer cell identifier group and the supplementary root index; and
   generating the at least one supplementary primary synchronization sequence according to an equation based upon a frequency domain sequence, with the at least one supplementary root index being a parameter, wherein the at least one supplementary root index is different a root index for generating the primary synchronization sequence.

2. The method according to claim 1, wherein the generating the supplementary secondary synchronization sequence for the supplementary synchronization signal under the predetermined rule comprises:
   generating at least one supplementary secondary synchronization sequence corresponding to the physical layer cell identifier group identifier according to a predefined equation;
   or
   scrambling the secondary synchronization sequence by at least one scrambling sequence to generate at least one supplementary secondary synchronization sequence;
   or
   cyclically shifting the secondary synchronization sequence by at least one cyclical shift number to generate at least one supplementary secondary synchronization sequence.

3. The method according to claim 2, wherein the generating the at least one supplementary secondary synchronization sequence corresponding to the physical layer cell identifier group identifier according to the predefined equation comprises:
   determining at least one pair of associated supplementary m-sequences corresponding to the physical layer cell identifier group identifier, according to a correspondence relationship between the physical layer cell identifier group identifier and the two associated supplementary m-sequences, and generating at least one supplementary secondary synchronization sequence according to a predetermined cyclical shift equation with the at least one pair of associated supplementary m-sequences being parameters, wherein an association relationship between the at least one pair of associated supplementary m-sequences is different from an association relationship between two m-sequences for generating the secondary synchronization sequence.

4. The method according to claim 1, wherein the transmitting the supplementary synchronization signal different from the synchronization signals to the UE over the predetermined second time-frequency resource comprises:
   transmitting the supplementary synchronization signal to the UE, according to a predetermined mapping relationship between the supplementary synchronization signal and the second time-frequency resource, over time-frequency resources of Orthogonal Frequency Division Multiplexing, OFDM, symbols indicated by the mapping relationship, over central N sub-carriers in a system bandwidth, wherein there is an interval of L*15 KHz between sub-carriers corresponding to the OFDM symbols indicated by the mapping relationship, wherein L represents an integer no less than 1, or L is more than 0 and less than 1.

5. The method according to claim 4, wherein the transmitting the supplementary synchronization signal to the UE over the OFDM symbols indicated by the mapping relationship comprises:

transmit the supplementary synchronization signal to the UE in OFDM symbols in n predetermined radio frame in a periodicity of m radio frames, wherein in each radio frame, OFDM symbols carrying the supplementary synchronization signal are determined, according to the mapping relationship between the supplementary synchronization signal and the second time-frequency resource, wherein m and n represent integers no less than 1.

6. An evolved Node B, eNB, comprising:
a synchronization transmitting component configured to transmit synchronization signals to a UE over a predetermined first time-frequency resource; and
a supplementary synchronization transmitting component configured to transmit a supplementary synchronization signal different from the synchronization signals to the UE over a predetermined second time-frequency resource, wherein both the synchronization signals and the supplementary synchronization signal correspond to the same physical layer cell identifier; so that the UE achieves downlink synchronization with an eNB, and determines a physical layer cell identifier by using the synchronization signals and the supplementary synchronization signal, wherein both the synchronization signals and the supplementary synchronization signal correspond to the same physical layer cell identifier,
a supplementary primary synchronization sequence generating component configured to generate a supplementary primary synchronization sequence for the supplementary synchronization signal under a predetermined rule, the supplementary primary synchronization sequence different from a primary synchronization sequence of the synchronization signals, wherein the length of the supplementary primary synchronization sequence is N, and the supplementary primary synchronization sequence corresponds to the identifier; and
a supplementary secondary synchronization sequence generating component is configured to generate a supplementary secondary synchronization sequence for the supplementary synchronization signal under a predetermined rule, the supplementary secondary synchronization sequence different from a secondary synchronization sequence of the synchronization signals, wherein the length of the supplementary secondary synchronization sequence is N, and the supplementary secondary synchronization sequence corresponds to a physical layer cell identifier group identifier, wherein N represents an integer no less than 62; and the supplementary synchronization signal is generated from the supplementary primary synchronization sequence and the supplementary secondary synchronization sequence, and the physical layer identifier within the physical layer cell identifier group and the physical layer cell identifier group identifier are used for determining the physical layer cell identifier;
wherein the supplementary primary synchronization sequence generating component is configured:
to generate at least one supplementary primary synchronization sequence corresponding to the physical layer identifier within the physical layer cell identifier group according to a predefined equation;
wherein when the at least one supplementary primary synchronization sequence is generated corresponding to the physical layer identifier within the physical layer cell identifier group according to the predefined equation, the supplementary primary synchronization sequence generating component is configured:
to generate at least one supplementary root index corresponding to the physical layer identifier within the physical layer cell identifier group, according to at least one group of predetermined correspondence relationship between the physical layer ID within the physical layer cell ID group and the supplementary root index; and to generate the at least one supplementary primary synchronization sequence according to the equation based upon the frequency domain sequence, with the at least one supplementary root index being a parameter, wherein the at least one supplementary root index is different a root index for generating the primary synchronization sequence.

7. The eNB according to claim 6, wherein the supplementary secondary synchronization sequence generating component is configured:
to generate at least one supplementary secondary synchronization sequence based on the physical layer cell identifier group identifier according to a predefined equation; or to scramble the secondary synchronization sequence by at least one scrambling sequence to generate at least one supplementary secondary synchronization sequence; or to cyclically shift the secondary synchronization sequence by at least one cyclical shift number to generate at least one supplementary secondary synchronization sequence.

8. The eNB according to claim 7, wherein when at least one supplementary secondary synchronization sequence is generated based on the physical layer cell identifier group identifier according to the predefined equation, the supplementary secondary synchronization sequence generating component is configured:
to determine at least one pair of associated supplementary m-sequences corresponding to the physical layer cell identifier group identifier according to a correspondence relationship between the physical layer cell identifier group identifier and the two associated supplementary m-sequences, and to generate at least one supplementary secondary synchronization sequence according to a predetermined cyclical shift equation with the at least one pair of associated supplementary m-sequences being parameters, wherein an association relationship between the at least one pair of associated supplementary m-sequences is different from an association relationship between two m-sequences for generating the secondary synchronization sequence.

9. The eNB according to claim 6, wherein the supplementary synchronization signal generating component is configured:
to transmit the supplementary synchronization signal to the UE, according to a predetermined mapping relationship between the supplementary synchronization signal and the second time-frequency resource, over time-frequency resources of OFDM symbols indicated by the mapping relationship, over central N sub-carriers in a system bandwidth, wherein there is an interval of L*15 KHz between sub-carriers corresponding to the OFDM symbols indicated by the mapping relationship, wherein L represents an integer no less than 1, or L is more than 0 and less than 1.

10. The eNB according to claim 9, wherein when the supplementary synchronization signal is transmitted to the UE in the OFDM symbols indicated by the mapping relationship, the supplementary synchronization signal transmitting component is configured:
to transmit the supplementary synchronization signal to the UE in OFDM symbols in n predetermined radio frame in a periodicity of m radio frames, wherein in each radio frame, OFDM symbols carrying the supplementary synchronization signal are determined, according to the mapping relationship between the supplementary synchronization signal and the second time-frequency resource, wherein m and n represent integers no less than 1.

\* \* \* \* \*